United States Patent [19]

Seaman

[11] Patent Number: 5,320,162
[45] Date of Patent: Jun. 14, 1994

[54] SINGLE POLE DOUBLE THROW THERMOSTAT FOR NARROW RANGE TEMPERATURE REGULATION

[76] Inventor: William E. Seaman, 2955 David La., Medford, Oreg. 97504

[21] Appl. No.: 972,276

[22] Filed: Nov. 5, 1992

[51] Int. Cl.$^5$ ............................................. F25B 29/00
[52] U.S. Cl. ........................................ 165/2; 165/26; 165/27; 236/1 C; 62/3.62; 62/3.61; 62/3.7; 337/338; 337/337; 337/340; 337/363; 337/364; 337/342; 337/349
[58] Field of Search ............................ 165/26, 27, 2; 236/78 A, 1 C; 337/338, 337, 340, 342, 349, 364, 363, 362; 62/3.61, 3.62, 3.7

[56] References Cited

U.S. PATENT DOCUMENTS

| | | | |
|---|---|---|---|
| Re. 16,654 | 6/1927 | Lewerenz | 337/362 |
| 516,043 | 3/1894 | Barney | 337/363 |
| 1,207,957 | 12/1916 | McElroy | 337/349 |
| 1,437,818 | 12/1922 | Roby | 337/362 |
| 1,477,350 | 12/1923 | Hoeschen | 337/364 |
| 1,724,425 | 8/1929 | Schaum | 337/364 |
| 1,824,114 | 9/1931 | Blakeslee | 337/372 |
| 1,848,440 | 3/1932 | Spitzenberger et al. | 236/1 C |
| 1,919,327 | 7/1933 | Getchell | 337/372 |
| 1,937,458 | 11/1933 | Armstrong | 337/363 |
| 1,961,649 | 6/1934 | Stewart | 337/372 |
| 2,120,488 | 6/1938 | Crago | 337/363 |
| 2,129,477 | 9/1938 | Parks | 337/364 |
| 2,162,296 | 6/1939 | Chappell | 337/340 |
| 2,181,957 | 12/1939 | Aldworth | 236/1 C |
| 2,290,944 | 7/1942 | Cunningham | 337/349 |
| 2,309,193 | 1/1943 | Holmes | 337/363 |
| 2,327,208 | 8/1943 | Newton | 236/1 C |
| 2,374,097 | 4/1945 | Holmes | 337/363 |
| 2,403,798 | 7/1946 | Holmes | 165/26 |
| 3,111,166 | 11/1963 | Munz et al. | 62/3.62 |
| 3,305,851 | 2/1967 | Brandtszteter | 62/3.61 |
| 3,713,302 | 1/1973 | Reviel | 62/3.62 |
| 4,407,133 | 10/1983 | Edmonson | 62/3.62 |
| 4,823,554 | 4/1989 | Trachtenberg et al. | 62/3.62 |

FOREIGN PATENT DOCUMENTS

| | | | |
|---|---|---|---|
| 21340 | 11/1935 | Australia | 337/340 |
| 439693 | 6/1925 | Fed. Rep. of Germany | 236/1 C |

Primary Examiner—John K. Ford
Attorney, Agent, or Firm—Townsend and Townsend

[57] ABSTRACT

A thermostat is disclosed having a bimetallic strip actuating a single pole, double throw switch, one throw to sense temperatures below the lower limit of a set point range and the other throw to sense temperatures above the upper limit of the set point range. In typical applications one throw for actuating heating and the other throw for actuating cooling. The bimetallic strip is provided with typically a cantilever support at one end and extends between dimensional spaced double throw contacts at the opposite end. Spacing of the contacts determines magnitude of the set point range. An intermediate beam type support is provided between the cantilever support and double throw contacts. This beam support consists of an adjustment screw acting on one side of the bimetallic strip and a spring directly opposing the adjustment screw. The adjustment screw moves the bimetallic strip relative to the contacts for operating excursion of the thermostat thus positioning the mid-point of the set point range between subfreezing and incubation temperature ranges. The spring is selected to act with respect to the adjustment screw to both bias the strip against the adjustment screw as well as provide a non linear vibrational damping to the bimetallic strip. Circuitry is disclosed for passing minimal current through the mechanical portions and amplifying and driving a heater or cooler, preferably electrical heaters and coolers. There results a thermostat which cannot thermally lockup, is resistant to vibration, and can be adjusted to narrow band operation over a wide range to temperatures.

13 Claims, 6 Drawing Sheets

SINGLE POLE DOUBLE THROW THERMOSTAT FOR NARROW RANGE TEMPERATURE REGULATION

This invention relates to temperature control thermostats. More specifically, a single pole double throw thermostat is disclosed for maintaining a controlled temperature range within narrow temperature limits such as those near freezing or body temperature. The thermostat is particularly useful with Peltier effect cooling devices and assures minimum power consumption during temperature control within the selected range. Preferred use of the thermostat is shown in conjunction with circuits that cause low current flows in the thermostat which are later amplified for control of the heating and cooling devices.

BACKGROUND OF THE INVENTION

With the sophistication of modern medical products, there has arisen a need to maintain such products while stored in narrow temperature ranges. Living organisms and cultures often must be maintained as near as possible to the "incubation point" (about 37° Centigrade) during storage and shipping. Other drugs, hormones and vaccines must be stored and shipped as close as possible to the freezing point (0° C.). However, these materials are damaged—and in some cases becoming fatally dangerous—if they are allowed to freeze. Insulin is a common example of such a hormone.

Ever since Banting and Best isolated insulin in 1922, diabetics the world over have become dependent upon this life giving hormone. A suspension of this polycrystalline material must be injected at least once daily for the typical Type 1 (juvenile onset) diabetic person to remain healthy. About one-half of the people with Type II (adult onset) diabetes also must take insulin. Often physicians will prescribe two different types of insulin to take with each injection, and also may require that several injections be taken each day. The diabetic can be in serious trouble without his insulin, and unless each insulin dose is carefully measured, hypoglycemia and sudden loss of consciousness may result.

Insulin is a temperature sensitive material. If it has been frozen, large particles, called clumps, permanently form in the injection vial. This clumping also takes place if the insulin suspension has been exposed to excessive temperatures.

The clumps will easily pass through the injection needles. However, a measured dose of this clumped material may contain many times the number of insulin crystals which otherwise would have been present in a similarly measured dose of unfrozen or unheated insulin. Since the biological potency of insulin is largely proportional to the number of crystals injected, life threatening errors in dosage can result from the use of clumped insulin.

Clumping will take place with crystal clear "Regular" insulin, without any noticeable change in appearance of the vial. However, the clumping effect is much more severe and potentially dangerous with the slower acting insulin preparations such as the isophane, zinc, and protamine suspensions commonly used by diabetics.

Another effect known as "fibril formation" takes place if insulin is exposed to room temperatures for any length of time. The new bio synthetic insulins are particularly prone to this effect.

Use of fibrilized insulin presents the same dangers as use of the clumped hormone. Also, the fibrils will clog the needles and orifices of syringes and jet injectors—a major problem with the new "insulin pens."

Apart from clumping and fibril formation is the degradation of insulin caused by exposure to light or by mechanical agitation and light. Just a few hours exposure to direct sunlight will result in substantial loss of potency. Indirect sunlight, for example, encountered when the vial is kept on a window sill, or in a room with florescent lighting, simply slows the rate of degradation. Shaking or vibration of the insulin vial results in similar loss of potency.

The ideal storage conditions are a temperature as close to freezing as practical, without actually freezing, and protection from mechanical agitation. The insulin manufacturers and their distributors try to maintain finished inventory while in storage or transit within the range of 2°–8° C. Only if stored within this temperature range, and protected from sunlight and mechanical agitation, can the manufacturer guarantee product quality to its expiration date.

Diabetes has afflicted mankind since time immemorial. However, in the past two decades its increase has exceeded the increase in world population by a considerable margin, brought about largely by the increase in longevity. A 1985 report by the World Health Organization states that seven percent of the population of the developed countries will have acquired diabetes by the age of forty. In the U.S. alone, it is estimated that there are over 10 million diabetics, about half of whom should take insulin.

Transport of such drugs is difficult. Simply stated, transport can only occur when it is assured that the drugs will be maintained as close as possible to their required temperature ranges. When this is understood, the inadequacy of conventional so-called "*instrument quality*" shipping devices can be understood.

First, one must understand that with respect to a drug that can only be stored in narrow temperature ranges, two things can happen. First, the drug can become too hot. Second, the drug can become too cold. Therefore, any system utilized during shipping must be capable of heating the shipment before it becomes too cold and cooling the shipment before it becomes too hot—all within the required narrow temperature ranges.

Conventional refrigeration and heating cycles are incompatible with most shipping requirements. The required apparatus and associated controls are too large—especially when relatively small quantities of temperature sensitive drugs must be rapidly shipped, as by air freight. One solution that has suggested itself is to use certain all electric heating and cooling equipment.

In such all electric heating and cooling equipment, resistance heating is utilized for adding thermal energy and so-called Peltier effect solid state heat pumps are utilized for cooling. Thus, the storage system can be simplified to essentially solid state electric devices and electric generation or battery devices having sufficient power to maintain the required temperature ranges during storage and/or transport.

The importance of absolute minimum power consumption can be further illustrated by considering the growing awareness and need for temperature control of medical materials in under developed countries and in remote locations where solar cell systems are the only practical source of electric power.

Unfortunately, the use of such temperature control devices has been curtailed by the lack of accurate, power conserving thermostats. A discussion of the inadequacy of conventional thermostats in the narrow temperature range environment is believed instructive.

The following discussion primarily concerns mechanical thermostat systems. Electronic temperature control systems using thermocouples, thermistors, and other electronic sensors together with associated circuitry, are either too large, too power consuming or too expensive for the applications considered here.

All conventional mechanical thermostats have two major control characteristics. One control characteristic is "differential" or hysteresis; this the difference between the devices "on to off" and "off to on" states. The other control characteristic is "tolerance"; this is the variation to which devices of the same class can be relied upon to change from one condition to the other. Remembering that utilizing conventional technology that a conventional thermostat is a single pole, single throw device, and that one device is required to control the heating apparatus and that another such device is required to control the cooling device, the inadequacies of these heating and cooling controls can be understood. Note, single pole, double throw devices will be discussed later.

Taking the case of relatively sensitive but inexpensive thermostats—which would be economically practicable with as shipping heating and cooling system—thermostats having a differential of no more than 5.6° C. and a tolerance of 0.8° C. can be reasonably purchased (currently for about $8.00). This will give a maximum temperature spread between the on and the off cycles of such devices of 7.2° C.

Now let us suppose that two such devices are utilized, one for heating and the other for cooling. Further, and in order to avoid both heating and cooling devices being in the "on" state simultaneously we separate the supposed devices by a safety margin of just 0.6° C.—a wholly impractical separation. It will be found that it will not be possible to control the temperature of the resulting heated and cooled shipment within a thermal range of less than 15° C!

Unfortunately, another problem enters this rather difficult temperature control environment. Where the two heating and cooling devices are placed as close as possible in the operating ranges to maintain temperature control within narrow thermal limits, the possibility of both the heating and cooling devices being in the "on" state emerges. Assume that the controlled environment becomes too cool and the heater turns on. Further assume that as the temperature rises—but before the heater turns off, the cooler is turned on. A condition known as "thermal lockup" is created. Taking the case of an all electric heating and cooling system relying on a finite and concomitantly shipped power source—such as a battery—required temperature control energy will be rapidly used. If all energy is consumed before the shipped goods reach their required destination, spoilage may result.

Because of the possibility of the condition known as thermal lockup, such individual heating and cooling thermostats are not set as closely in their respective operating ranges as might be desired for the required temperature control. The result is even further temperature excursion of the stored and/or shipped drugs.

Precision single pole double throw (SPDT) "snap action" mechanical thermostats are available from manufacturers. However, thermostats of this type suffer from the problems of differential and tolerance previously described and are thus unsuitable where narrow temperature control ranges are necessary. Although these SPDT thermostats can be used to eliminate the thermal lockup condition, they present another problem—the SPDT element instantaneously switches from one contact to the other. Thus, heating or cooling is always on, even when the shipment is within its desired temperature range and neither heating or cooling is required. This can be as wasteful of power as the thermal lockup condition.

As stated earlier, an ideal temperature range for storing and shipping insulin, certain hormones, vaccines, and other drugs is 2-8° C. In incubation application applications, a temperature range of 35-37° C. is often required. As has been shown, these narrow control ranges are not practical with conventional miniature mechanical thermostat systems, and sophisticated electronic systems needed for such tight temperature control are either too large, too power consuming, or too expensive for the application.

For purposes of saving power, neither heating or cooling should be applied, or remain on, so long as the shipment is within its acceptable temperature range. For example, when the desired temperature range is from 2° to 8° C., an ideal situation would have the temperature spread between application of heating or application of cooling ("dwell") as wide as practical, but never exceeding 6° C. Similarly, in the incubation application, the dwell should be as close to 2° C. as practical but never exceeding 2° C.

Assuming that temperature control is required for drug goods in transport—such as during conventional "air freight" or the conventional air plane travel of a diabetic—other problems immediately surface. Vibration is such a problem. Typically, the shipper or traveller has no control over such vibration; any temperature control system must consequently be reasonably resistance to vibration.

Simply stated, temperature control within narrow operating ranges is other than trivial—especially where storage during transport is required.

Consequently, there is a need for a temperature control device which can be used during storage and transport for the control of heating and cooling devices to maintain temperatures sensitive materials within narrowly defined temperature ranges while consuming a minimum amount of power. This disclosure is directed to such a device.

SUMMARY OF THE INVENTION

A thermostat is disclosed having a bimetallic strip actuating a single pole, double throw switch, one throw to sense temperatures below the lower limit of a set point range and the other throw to sense temperatures above the upper limit of the set point range. In typical applications one throw for actuating heating and the other throw for actuating cooling. The bimetallic strip is provided with typically a cantilever support at one end and extends between dimensional spaced double throw contacts at the opposite end. Spacing of the contacts determines magnitude of the set point range. An intermediate beam type support is provided between the cantilever support and double throw contacts. This beam support consists of an adjustment screw acting on one side of the bimetallic strip and a spring directly opposing the adjustment screw. The adjustment screw moves the bimetallic strip relative to the contacts for operating excursion of the thermostat thus positioning the mid-point of the set point range between subfreezing and incubation temperature ranges. The spring is selected to act with respect to the adjustment screw to both bias the strip against the adjustment screw as well as provide non linear vibrational damping to the bimetallic strip. Circuitry is disclosed for passing minimal current through the mechanical portions and amplifying and driving a heater or cooler, preferably electrical heaters and coolers. There results a thermostat which cannot thermally lockup, is resistant to vibration, and can be adjusted to narrow band operation over a wide range of temperatures.

DESCRIPTION OF THE PREFERRED EMBODIMENT

Figure 1:
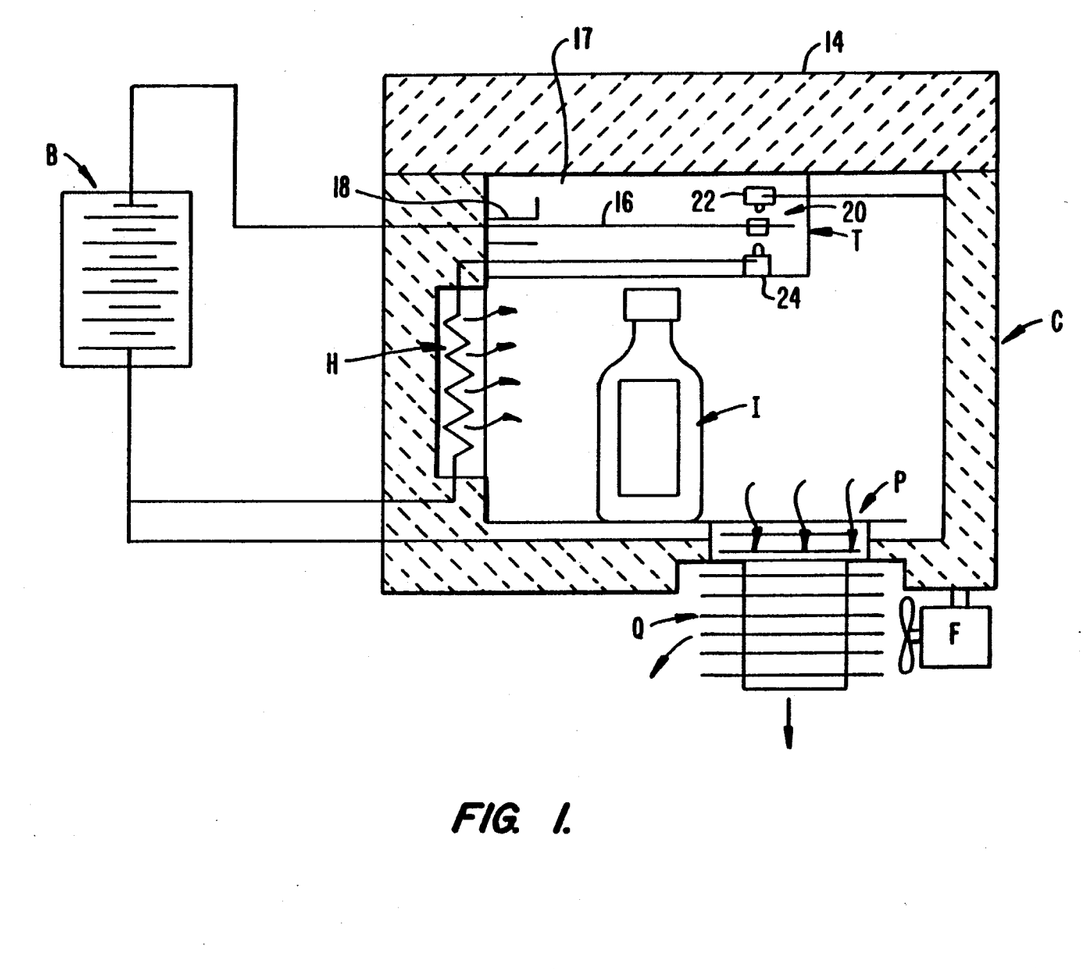
FIG. 1 is a schematic illustrating the components only of a portable storage and transport system for temperature sensitive drugs including an electrically heated and cooled containment device; the temperature control thermostat according to this invention; and a battery power supply for furnishing sufficient power to maintain the required temperature range.

Referring the FIG. 1, a schematic representation of the type of thermal storage system with which the disclosed thermostat finds preferred use is set forth. A thermally insulated container C with a top 14 is disclosed containing a vial of insulin I. The container C has built integral to the walls thereof heater H and Peltier cooler P. A battery B acting through the thermostat of this invention alternately activates heater H—when insulin I is too cold—or Peltier cooler P—when insulin I is too hot.

Battery B connects to thermal excursion member 16, here a bimetallic strip. Member 16 is mounted to housing 17 at mounting 18 and undergoes excursion responsive to temperature in container C. When the temperature of container C with insulin I is above the upper limit of the desired temperature control range, contact of bimetallic strip 16 occurs with contact 22 connecting battery B across Peltier cooler P. Heat is evacuated from the interior of container C cooling insulin I.

When the temperature of container C with insulin I is below the lower limit of the desired temperature control range, contact of bimetallic strip 16 occurs with contact 24 connecting battery B across resistance heater H. Heat is supplied to the interior of container C heating insulin I.

Comments can be made about the disclosed all electric heating and cooling system. First, it can be seen that presuming that the respective contacts 22, 24 are sufficiently spaced apart the condition of thermal lockup cannot exist. Either heater H or Peltier effect cooler P will be on; the heater and cooler will never be on at the same time.

Second, and presuming that the disclosed system includes a battery utilized to supply power during shipping, an extremely limited energy source is applied to maintain insulin I at its respective temperature. Accordingly, it is required that power be conserved—a requirement that could not be met by a system subject to thermal lockup, or by a system requiring that either the heater or cooler always be on.

Third, it should be noted that in an actual operating situation the environmental temperature typically will be above or below the upper or lower limits of the desired temperature control range. If, for example, this range is 2°–8° C., consider a situation where cooling is necessary. Bimetallic strip 16 will make electrical connection to contact 22 and remain in connection until the temperature of the interior of container C and insulin I falls about 77.5° C. At this point the cooler turns off. As heat from the environment enters container C, its temperature rises, causing the cooler to turn on again. Thus, the cooler will cycle on and off between the upper limit of the control range, e.g., 8° and 7.5° C.

This same process takes place when heating is required. The heater will cycle on and off, e.g., between 2° C. and 2.5° C. It should be noted that this arrangement permits a minimum use of power—just enough to keep the container C and insulin I just within the limits of the desired temperature control range.

Figure 2A:
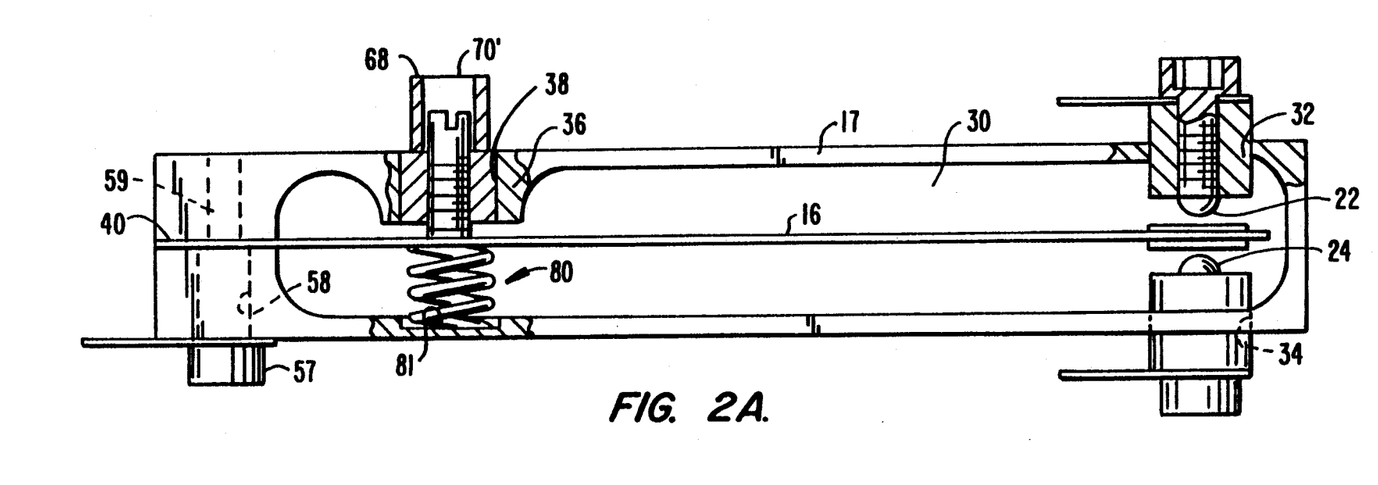
FIG. 2A is a side elevation section taken at the thermostat housing illustrating the single pole, double throw action and illustrating the mean temperature adjustment screw and vibration de-coupling spring.
Figure 2B:
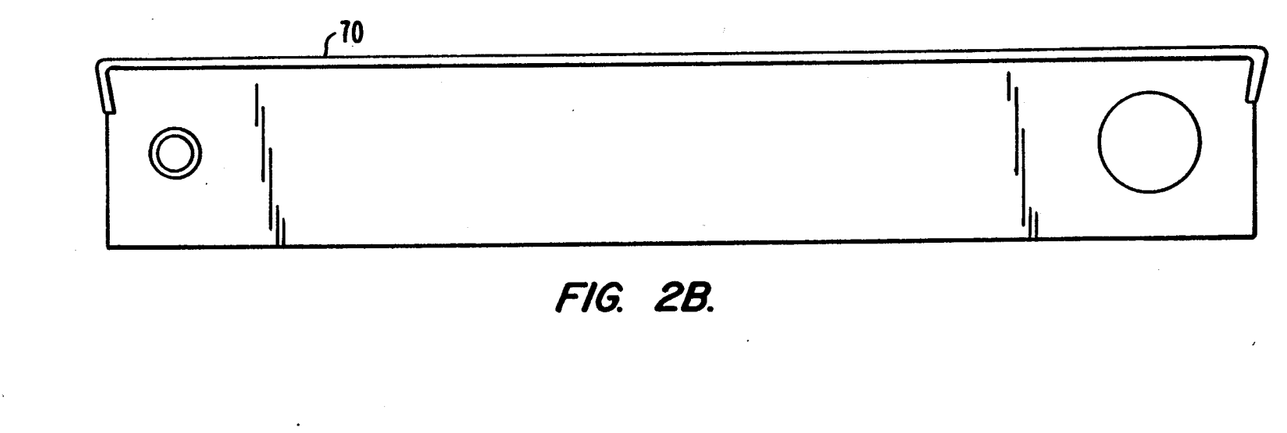
FIG. 2B is a plan view of the housing illustrating placement of the housing cover to the assembled housing.

Having set forth the general schematic of the disclosed system, attention to can be devoted to FIG. 2A and 2B for the overall system construction.

Referring to FIG. 2A, housing 17 is illustrated in detail. Preferably housing 17 is aluminum configured with a hollow interior 30. Housing 17 includes two opposed contact mountings 32, 34, for mounting opposed contacts 22, 24. A biasing screw mounting protrusion 68 having a mounting bore 38 is configured in thickened portion of the housing wall. At the end of the housing distal from contacts 22, 24, there is configured a slot 40 for receiving bimetallic blade 16.

Figure 3A:
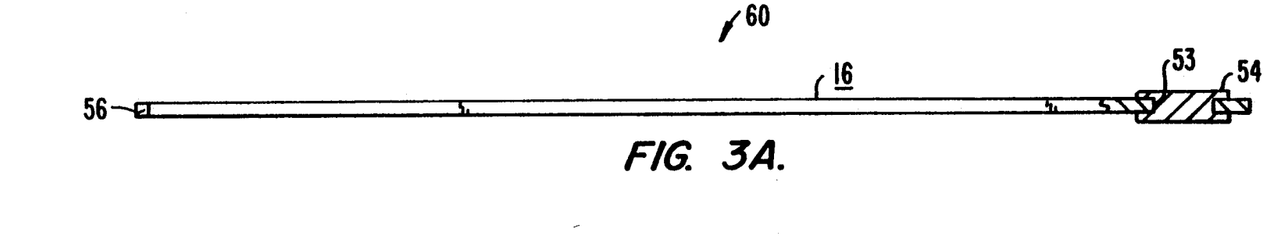
FIG. 3A and 3b are respective plan view and side elevation of the bimetallic blade and attached contacts.
Figure 3B:
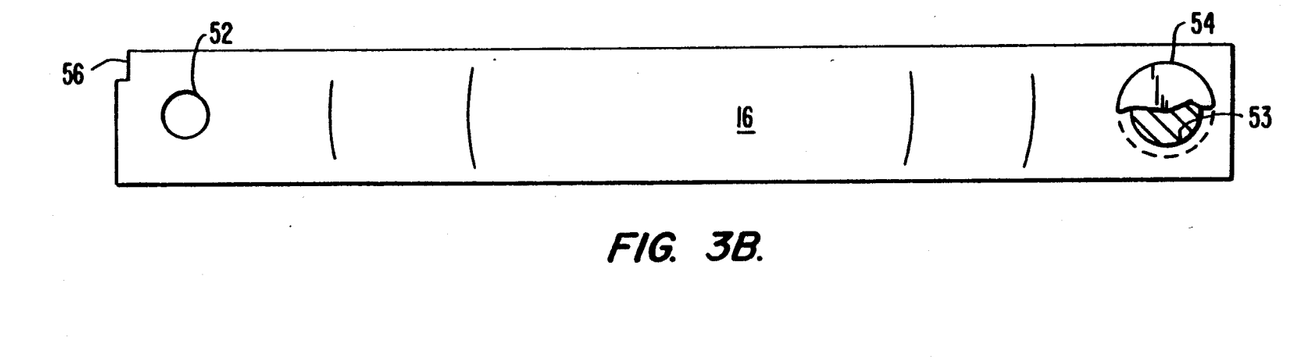

Referring to FIG. 3A and 3B bimetallic strip 16 can be understood. As is conventional, bimetallic strip 16 has a metal with a first coefficient of expansion on one side, and at least a metal of second coefficient of expansion on the other side. The bimetallic strip in response to low temperature bends in a first direction. The strip in response to high temperature bends in a second and opposite direction. In the preferred embodiment, bimetallic strip 16 is a standard item of manufacture which can be obtained from Texas Instruments of Attleboro, Mass. and is sold under the designation of P675R. For mounting purposes, hole 52 is configured at one end. A hole 53 accommodates an Ag-Cd or Ag-Au rivet available from Derringer Mfg. Co. of Mundelin, Ill. After placement to bimetallic strip 16, machining occurs to render the contact surface of dimension, free from burrs. To assure assembly with convex side 60 when bimetallic strip 16 is heated, locator notch 56 is machined in the strip. This assures that when assembly occurs, thermostat cover 70 will only fit over the thermostat when strip 16 is correctly oriented.

Mounting of bimetallic strip 16 occurs through hole 52 by mounting screw 57 drawing the housing at wide bore 58 firmly onto strip 16 when mounting screw meshes with threads in bore 59. A cantilever mount occurs.

At this point, the reader will understand that an operable—but not preferred thermostat has been disclosed. Presuming that bimetallic strip 16 undergoes excursion between contact 22, 24, control will result within a narrow range of temperature. This range of temperature will be a direct function of the spacing of the respective contacts 22, 24, and the dimension of contacts 54 on bimetallic strip 16. typically, this range (dwell) may be set from 1° C. to 15° C. as established by the spacing of contacts 22 and 24 during manufacture of the thermostat.

Provision must be made for adjusting the temperature limits to which the thermostat responds. Accordingly, a bias screw bushing 68 is pressed into aperture 38 and contains a bias screw 70 prime. Screw 70 prime, dependent upon its degree of penetration bears against strip 16. Acting against the essentially cantilever support of notch 40 in housing 17, strip 16 will be biased into an operable temperature range.

At this point the reader will realize that an operable and adjustable apparatus is disclosed. However, experience has demonstrated that this apparatus is as yet unsuitable for the preferred operation of the disclosed thermostat.

Testing of the configuration recited thus far has revealed two important defects. First, strip 16 can resonate in the range of 70 to 90 Hz between the respective contacts 22, 24. Secondly, and presuming that operable adjustment of screw 70 prime occurs to move the operating range from about −20° C. to an operating range of about 45° C., bending of strip 16 occurs at the cantilever mount to housing 17.

Accordingly, housing 17 is provided with a spring counter sink 81 into which damping coil spring 80 is mounted. Spring 80 is 0.120 inch diameter coil of spring wire of 0.020 diameter having free length of 0.157/0.154 inches and a fully compressed (coil touching coil) length of 0.89/0.86 inches. Thus, when screw 70 prime fully compresses coil spring 80, the spring acts as a stop.

A relatively surprising result is present. Specifically, it has been found that spring 80 non linearly damps strip 16 against vibration. In particular, when the thermostat is vibrated at 70 to 90 Hz, or at other frequencies expected in travel or shipping situations, vibration of strip 16 between contacts 22, 24 no longer occurs. Consequently, the disclosed construction can be relied upon in virtually all such environments.

At this juncture, the mechanics of the disclosed thermostat will be operable. There remains the desireablity of allowing as little as possible current to flow through the thermal excursion member 16. Further, and once current does flow through the thermal excursion member 16, it is necessary to amplify that current to drive the heater H and the cooler P. In the specification here, such amplification occurs by actually generating current necessary to optimally drive the heater H and cooler P here shown in the preferred embodiment. The reader will understand that where other types of heater and coolers are utilized, other types of amplification will be used. For example, if the heater is an engine driven reversible heat pump on a cargo container—such as those routinely used topside on a marine vessel—the amplifier would start and polarize the heat pump in the desired direction. Naturally, where and when the contact was in excursion between the points, no operation of the motor and the heat pump would be required.

Figure 5:
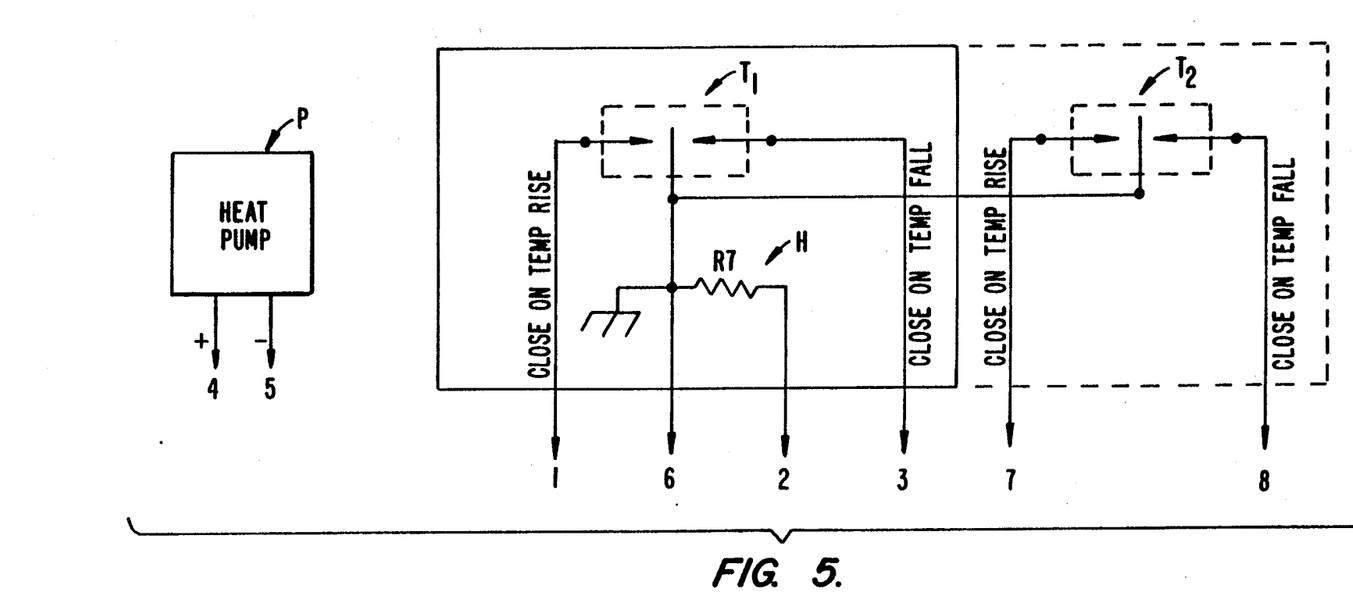
FIG. 5 is a circuit schematic of the heater and cooler showing the connection of two thermostats to the heater and cooler, with one thermostat for maintaining the interior near the freezing point and the other thermostat for maintaining the interior near the incubation point; and, FIG. 6 illustrates a double throw double pole transfer switch for alternatively connecting one or the other of the thermostats and that can be used for switching between the two respective thermostats of FIG. 5.

Referring first to FIG. 5, a connection schematic of heater H, cooler P, near freezing thermostat $T_1$ and incubation thermostat $T_2$ is shown. Connection to output pads 1-8 is illustrated.

Figure 6:
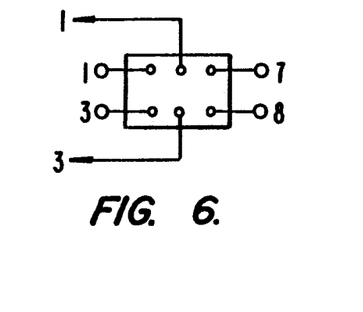

Next referring to FIG. 6, a conventional double pole, double throw switch 100 is shown combining input from pads 1 and 3 from thermostat $T_1$ and pads 7 and 8 from thermostat $T_2$. Should the device operate on only one thermostat $T_1$, thermostat $T_2$ together with switch 100 would be omitted.

Having set forth the general configuration, operation of the device can be set forth. Pads 7 and 8 will be ignored; discussion will only include pads 1-6.

Figure 4:
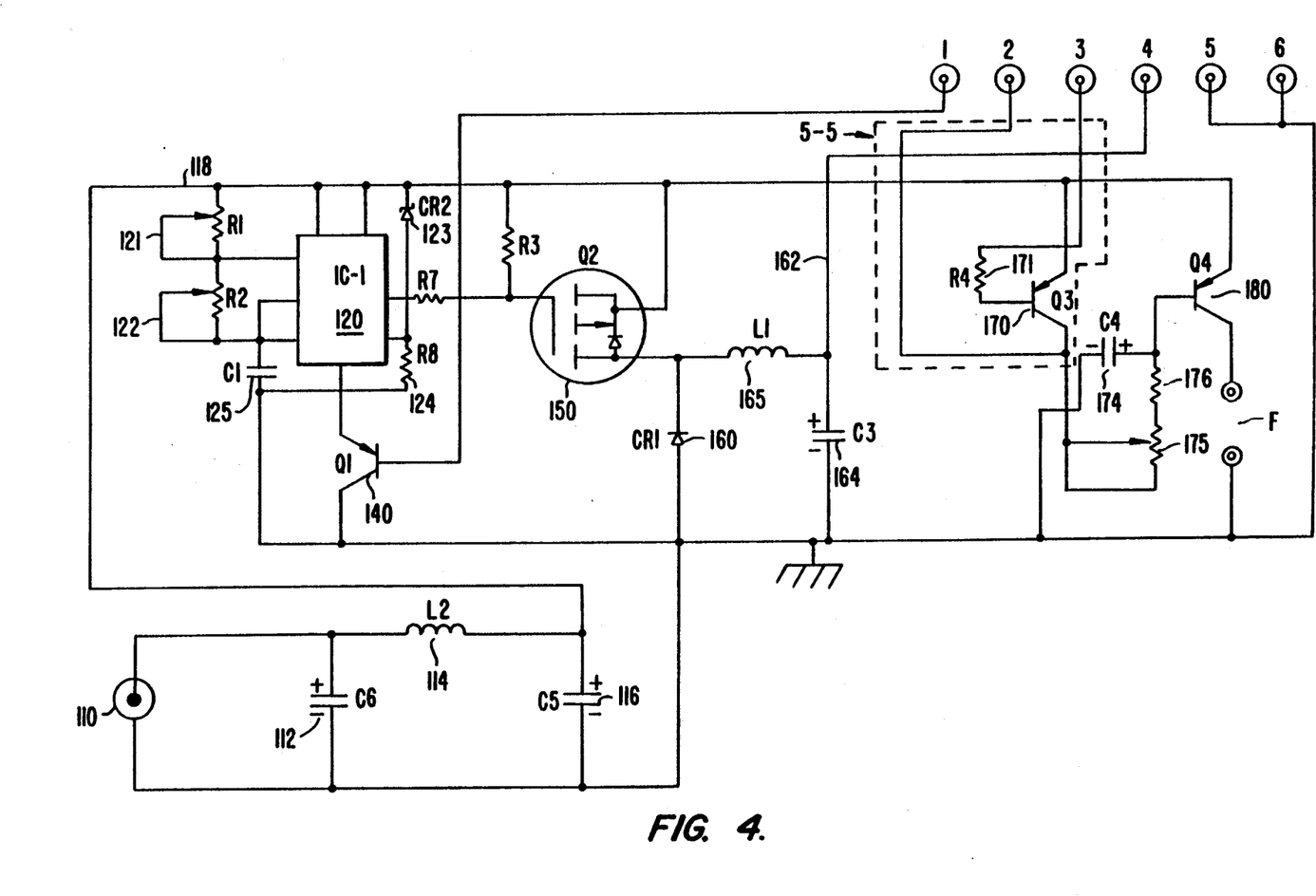
FIG. 4 is an electric schematic of a circuit which both amplifies and directly provides driving power to the all electrical heating and cooling components to maintain low current flow within the disclosed thermostat.

Power input to the disclosed circuit occurs through jack 110 which is preferably connected to a source of 12 volts dc. As will hereafter be understood, provision is made for receiving power in the range of 15 to 6 volts dc, a±47% voltage variation. This is done so that if storage batteries are used with the device, operation can still occur. It will be understood that both over voltage and under voltage from 12 volt power supplies are common. For example, when the battery in a car is being charged—over voltage can be encountered. Further, when a battery attached to a shipped article is discharging the last substantial fraction of its available power, utilization of this power at low voltage is required to realize the full efficiency of the battery. Consequently, the circuit is designed to be functional in the 15 to 6 volt DC range.

Power input is conventional. It includes an input filter consisting of capacitors 112, 116, and inductor 114. This filter serves two purposes: 1) to prevent possible spikes or transients on the nominal 12vdc power input source from damaging the electronic circuitry, and 2) to prevent the high frequency ac signal generated as part of the circuitry's operation from being conducted to or radiating from the input power source or the wiring thereto. Note: this is important because such RFI signals interfere with radio reception in automobiles or homes and are not allowed in commercial air shipments.

A primary output from the circuitry to be described is used to power a Peltier type cooler. Such devices require a high current and substantially constant low voltage for their proper operation, in the present application typically about 1.0 ampere at 4.0±0.4 vdc, a voltage variation of only 10% when input voltage can vary ±47%.

Summarizing circuit operation, timer 120 is a variable duty cycle square wave oscillator. MOSFET 150 together with diode 160, inductor 165, and capacitor 164 comprise the components of a switching regulator type dc to dc converter. When the gate of MOSFET 150 is driven by the output of timer 120, a dc output voltage appears on line 162 to power the Peltier cooler. This output voltage is proportional to the length ratio of minus pulses to plus pulses of the square wave output from timer 120.

Variable resistors 121, 122, and capacitor 125 serve set the frequency and static duty cycle of timer 120, thus determining the output voltage of the dc to dc converter, say 4.0 vdc for any nominal input voltage, say 10.5 vdc. Zener diode 123 and resistor 124 serve to modulate the duty cycle of the output from timer 120 such that the length ratio of minus to plus pulses increases as input voltage falls.

Thus we have an output voltage regulated dc to dc converter providing an output voltage of say 3.6 to 4.4 vdc when input voltage varies from 6 to 15 vdc. It should be noted that conventional output voltage regulated power converters use "dissipative" type regulation rather than the duty cycle type regulation described here. Dissipative type regulation wastes power, whereas the modulated duty cycle type described here does not—a further method of conserving power in the application heretofore described.

Returning to FIGS. 1, 4 and 5, transistor 140 turns on timer 120 causing operation of the dc to dc converter thus supplying power to Peltier cooler P. Transistor 170 turns on heater H. The base of transistor 140, and the base, or gate if a MOSFET, of transistor 170 connect directly or indirectly to the cooler and heater contacts of the thermostat. Transistor 140 and its associated dc to dc converter circuitry, and transistor 170 are basically amplifiers, requiring very little current from the thermostat contacts, say 0.5 milliamperes or less to control in the case of the cooler 1.0 ampere, and in the case of the heater 55 milliamperes.

Figure 7:
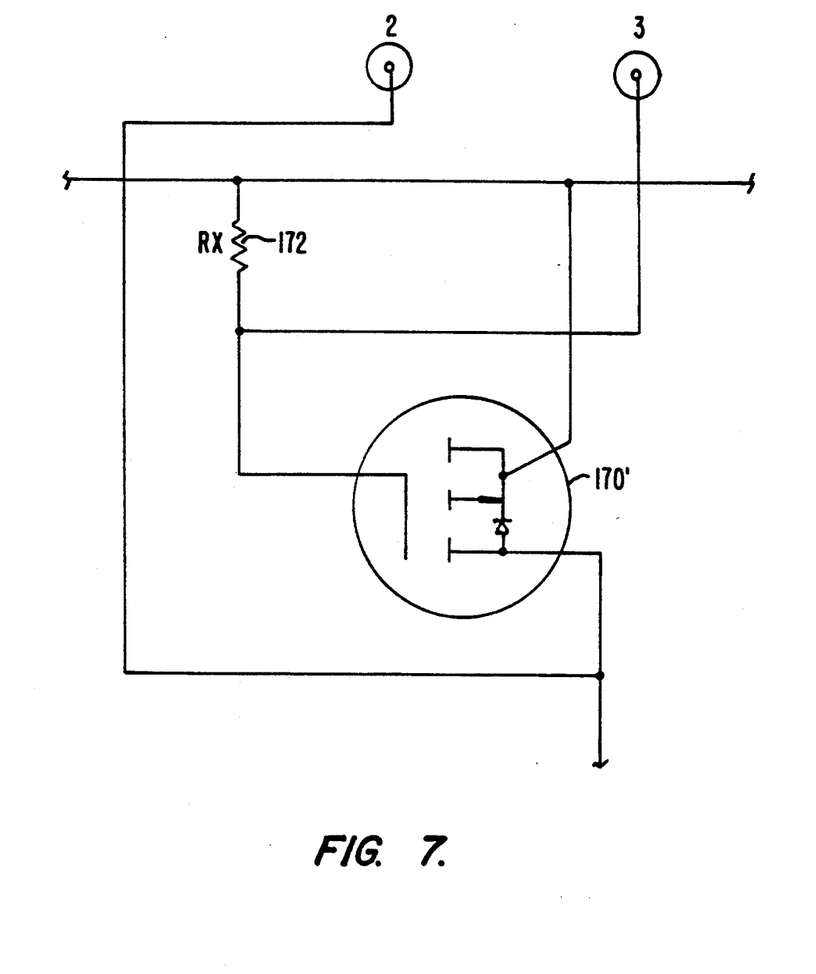
FIG. 7 illustrates a MOSFET embodiment of a switching circuit which can be substituted for block 5—5 in FIG. 4.

In applications such as incubation, heater H may be required to produce more heat, thus requiring more current. In this case PNP transistor 170 is replaced by a MOSFET, resistor 171 is replaced by a jumper wire, and resistor 172 is installed as in shown in FIG. 7. This combination allows about 0.1 milliamperes from the thermostat to control several amperes of heater current.

As stated earlier, in a typical application requiring cooling, the Peltier cooler cycles on and off: off when thermostat bimetallic strip contact 20 is in the dwell zone. In such a cooling mode, fan F should run continuously so as to provide air flow and convection cooling of heat radiator (heat sink) Q. In a heating mode, however, the fan should never be on. In a heating mode, similarly, the heater will be cycling on and off.

Appropriate logic for this fan control is provided by transistor 180, capacitor 174 and resistors 175, 176 Unless heater is on, base of transistor 180 will be pulled down through resistors 175, 176 and heater resistor H, causing fan F to run. When the thermostat commands heat, the collector of transistor 170 is pulled up together with the base of transistor 180, through resistors 175, 176, stopping fan. Capacitor 174 prevents the fan from starting during the cycling on and off of the heater.

The reader will also realize that there is a process disclosed in this patent application. Specifically, and by merely adjusting the distance between the opposed contacts 22, 24, the temperature range of the controlled insulated chamber is in itself controlled. This range of control will vary depending upon the length of the bimetallic strip and the location of the contacts with respect to the strip.

Taking the case of a strip of 1.263 inches of length from its protrusion from the cantilever support to the center point of the contracts, the following temperature ranges are obtainable:

| DWELL (Space between contacts less blade contact thickness) Inches | TEMPERATURE (Range difference between applying hot and cold) °C. | TOTAL TEMPERATURE SWING (When mid-point of range) is held at 36.0° C.) | | | |
|---|---|---|---|---|---|
| | | Heating | | Refrigeration | |
| | | On | Off | Off | On |
| 0.002" | 1.0° | 35.5° C. | 36.0° C. | 36.0° C. | 36.5° C. |
| 0.004" | 2.2° | 34.9° | 35.4° | 36.6° | 37.1° |
| 0.006" | 3.5° | 34.2° | 34.7° | 37.3° | 37.8° |
| 0.008" | 4.8° | 33.6° | 34.1° | 37.9° | 38.4° |
| 0.012" | 7.4° | 32.3° | 32.8° | 39.2° | 39.7° |
| 0.016" | 9.8° | 31.1° | 31.6° | 40.4° | 40.9° |

What is claimed is:

1. A double throw single pole thermostat for controlling at a first throw position the heating and a second throw position the cooling of a temperature controlled chamber, said thermostat comprising in combination:

a substantially, straight bimetallic thermal excursion member having thermally differential expanding and contracting portions including a mounting portion at one end a contact portion at an opposite end and a conductor for communicating electrical current to said contact portion:

a cantilever mount means for mounting said substantially linear thermal excursion member at said mounting portion in thermal communication with said temperature controlled chamber;

a beam support spaced apart from said cantilever mount support means; and located between said cantilever mount means and said contact portion a range adjustment member for biasing said substantially straight bimetallic excursion member to move between opposed poles at a specific range of temperatures, said beam support including an adjustment member on one side of said bimetallic member and an opposing spring on the opposite side of said bimetallic ember and substantially coaxial to said adjustment member;

paired spaced apart contact poles defining said first and second throws, said spaced apart contact poles sufficiently spaced apart for permitting said thermal excursion member at said contact portion to freely move in excursion between said poles for forming contact with one or the other of said poles, and having an excursion interval between said poles where said contact is not in contact with either of said poles;

means mounting said poles with respect to said housing to dispose said poles with the contact portion of said thermal excursion member mounted therebetween whereby heat energy communicated to or from said thermal excursion member caused said contact portion to move into contact with one or the other of 2. A double throw single pole thermostat for controlling at a first throw position the heating and at a second throw position the cooling of a temperature controlled chamber, said thermostat comprising in combination:

a substantially, straight bimetallic thermal excursion member having thermally differential explained and contracting portions including a mounting portion at one end a contact portion, at an opposite end and a conductor for communicating electrical current to said contact portion:

means for cantilever mounting said thermal excursion member at said mounting portion in thermal communication with said chamber including a first mounting for holding said thermal excursion member to said housing at said mounting portion;

a beam support member located between said cantilever mount means and said contact portions and including, means for adjusting the thermal excursion of said substantially straight bimetallic thermal excursion member spaced apart from means for mounting for changing the thermal range of excursion of said contact portion between opposed poles; and, spring means for opposing said means for adjusting the substantially, straight bimetallic excursion member substantially co-axial to said means for adjusting the thermal excursion;

paired spaced apart contact poles defining said first and second throws, said spaced apart contact poles sufficiently spaced apart for permitting said substantially, straight bimetallic thermal excursion member at said contact portion to freely move in excursion between said poles for forming contact with one or the other of said poles, and having an excursion interval between said poles where said contact is not in contact with either of said poles;

means mounting said poles with respect to said housing to dispose said poles with the contact portion of said thermal excursion member mounted therebetween whereby heat energy communicated to or from said thermal excursion member caused said contact portion to move into contact with one or the other of said poles or to a position between said poles out of contact with both said poles.

3. The double pole double throw thermostat of claim 2 and wherein:

said substantially straight bimetallic thermal excursion member comprises a bimetallic strip.

4. A double throw single pole thermostat for controlling at a first throw position the heating and at a second throw position the cooling of a temperature controlled chamber, said thermostat comprising in combination:

a substantially straight bimetallic strip having thermally differential expanding and contracting portions including a mounting portion at one end a contact portion at an opposite end, and a conductor for communicating electrical current to said contact portion:

means for cantilever mounting said bimetallic strip at said mounting portion in thermal communication with said temperature controlled chamber;

a beam support for supporting said bimetallic strip at a location spaced apart from said cantilever mounting means and located between said cantilever mounting means and said contact portion, said beam support including an adjustment screw for biasing the thermal excursion of said strip to change the range of temperature response of said thermostat;

a spring substantially co-axially opposed to said adjustment screw for biasing said strip against said adjustment screw and providing a vibration decoupling portion of said beam support for said bimetallic strip; and, paired spaced apart contact poles defining said first and second throws, said spaced apart contact poles sufficiently spaced apart for permitting said bimetallic strip at said contact portion to freely move in excursion between said poles for forming contact with one of said poles or other of said poles, and having an interval between said poles where said contact portion is not in contact with either of said poles.

means mounting said poles with respect to said housing to dispose said poles with the contact portion of said bimetallic strip mounted therebetween whereby heat energy communicated to or from said bimetallic strip causes said contact portion to move into contact with one of said poles, the other of said poles for alternately heating or cooling said chamber or to a position between said poles out of contact with both said poles.

5. The single pole double throw thermostat of claim 4 and wherein said means for cantilever mounting said bimetallic strip at said mounting portion to said housing further includes;

a housing;

a first mounting on said housing for holding said mounting portion of said bimetallic strip and permitting said strip to extend outwardly from said housing.

6. The single pole double throw thermostat of claim 5 and wherein said spring is a coil spring have a first portion mounted to said housing, a second portion contacting said bimetallic strip, and having a cylindrical coil which when fully compressed forms a stop for said adjustment screw acting on said bimetallic strip.

7. A storage container and thermostat for permitting the storage of contents with in a closely controlled temperature range powered by a source of electrical energy, said storage container comprising in combination:

an insulated chamber for containing said contents within a closely controlled temperature range;

an electrical heater communicated to said chamber for raising the temperature of said contents when said contents become too cold with respect to said temperature range;

an electrical cooler communicated to said chamber for lowering the temperature of said contents when said contents become too hot with respect to said temperature range;

a double throw single pole thermostat for controlling at a first throw position the heating and at a second throw position the cooling of a container, said thermostat including;

a thermal excursion member including a straight bimetallic strip having thermally differential expanding and contracting portions, a mounting portion, a contact portion, and a conductor for communicating electrical current to said contact portion:

means for cantilever mounting said thermal excursion member at said mounting portion in thermal communication with said chamber;

a beam support for supporting said bimetallic strip at a location spaced apart from said cantilever mounting means, and located between said cantilever mounting means and said contact portion, said beam support including an adjustment screw for biasing the thermal excursion of said strip to change the range of temperature response of said thermostat;

a spring substantially co-axially opposed to said adjustment screw for biasing said strip against said adjustment screw and providing a vibration decoupling portion of said beam support for said bimetallic strip;

paired spaced apart contact poles defining said first and second throws, said spaced part contact poles sufficiently spaced apart for permitting said thermal excursion chamber at said contact portion to freely move in excursion between said poles for forming contact with one pole, the other of said poles, and having an interval between said poles where said contact portion is not in contact with either of said poles;

means mounting said poles with respect to said thermal excursion member to dispose said contact portion of said thermal excursion member between said poles for receiving an electrical signal upon said thermal excursion member causing said contact to contact one or the other of said poles;

means for switching on said electrical heater communicated to one said pole; and , means for switching on said electric cooler communicated to the other said pole whereby said thermal excursion member either contacts said one pole to produce electrical heating, contacts said other pole to produce electrical cooling, or dwells in said spatial interval therebetween without causing electrical heating or cooling.

8. The invention of claim 7 and wherein said means for switching on said electrical cooler includes a DC to DC converter.

9. The invention of claim 8 and including:
a heat sink connected to said cooler;
a fan for moving air across said heat sink;
means for running said fan when said switching means for said cooler is on.

10. The invention of claim 7 and wherein said means for switching said heater and said cooler includes:
means connected to said thermostat for running low current through said thermostat; and,
said means for switching said heater and said cooler includes amplification means for sensing said low current through said thermostat and supplying operating power to said heater or cooler.

11. A thermostat for permitting the storage within an insulated chamber in a closely controlled temperature range, said storage container including, an insulated chamber for storage within a closely controlled temperature range, a heater communicated to said chamber for raising the temperature when said chamber become too cold with respect to said temperature range responsive to an electric signal, an electrical cooler communicated to said chamber for lowering the temperature of said contents when said contents become too hot with respect to said temperature range;

first electrical means for activating said heater;

second electrical means for activating said cooler;

a double throw single pole thermostat for controlling at a first throw position the heating and at a second throw position the cooling of a container, said thermostat including;

a substantially, straight thermal excursion member having thermally differential expanding and contracting bimetallic portions, a cantilever mounting portion at one and, a contact portion at an opposite end, and a conductor for communicating electric current to said contact portion;

means for cantilever mounting said thermal excursion member at said cantilever mounting portion in thermal communication with said chamber;

a beam support for supporting said bimetallic strip at a location spaced apart from said means for cantilever mounting and located between said means for cantilever mounting and said contact portion, said beam support including an adjustment screw for biasing the thermal excursion of said strip to change the range of temperature response of said thermostat;

a spring substantially co-axially opposed to said adjustment screw for biasing said strip against said adjustment screw and providing a vibration decoupling of said beam support for said bimetallic strip;

paired spaced apart contact poles defining said first and second throws, said spaced apart contact poles sufficiently spaced apart for permitting said thermal excursion member at said contact portion to freely move in excursion between said poles for forming contact with one pole, the other of said poles, and having an interval between said poles where said contact portion is not in contact with either of said poles;

means for mounting said poles to dispose said poles with the contact portion of said thermal excursion member mounted therebetween for receiving from said poles an electric signal upon said thermal excursion member causing said contact to contact one or the other of said poles;

means for switching on said first electrical means communicated to one said pole; and, means for switching on said second electrical means communicated to the other said pole whereby said thermal excursion member either contacts said one pole to produce electric heating, contacts said other pole to produce electric cooling, or dwells in said spatial interval therebetween without heating or cooling.

12. A thermostat for permitting the storage of contents within an insulated chamber in a closely controlled temperature range, said storage container including, an insulated chamber for containing said contents within a closely controlled temperature range, a heater communicated to said chamber for raising the temperature of said contents when said contents become too cold with respect to said temperature range responsive to first amplifier means, an electric cooler communicated to said chamber for lowering the temperature of said contents when said contents become too hot with respect to said temperature range responsive to second amplifier means;

a double throw single pole thermostat for controlling at a first throw position the heating and at a second throw position the cooling of a container, said thermostat including;

a substantially straight bimetallic strip thermal excursion member having thermally differential expanding and contracting portion; a mounting portion at one end, a contact portion at an opposite end, and a conductor for communcicating electrical current to said contact portion:

means for cantilever mounting said thermal excursion member at said mounting portion in thermal communication with said chamber;

a beam support for supporting said bimetallic strip at a location spaced apart from said cantilever mounting means and located between said cantilever mounting means and said contact portion said beam support including an adjustment screw for biasing the thermal excursion of said strip to change the range of temperature response of said thermostat;

a spring substantially co-axially opposed to said adjustment screw for biasing said strip against said adjustment screw and providing a vibration de-coupling portion of said beam support for said bimetallic strip;

paired spaced apart contact poles defining said first and second throws, said spaced apart contact poles sufficiently spaced apart for permitting said thermal excursion member at said contact portion to freely move in excursion between said poles for forming contact with one pole, the other of said poles, and having an excursion interval between said poles where said contact portion is not in contact with either of said poles;

means mounting said poles with respect to said thermal excursion member to dispose said poles with the contact portion of said thermal excursion member mounted therebetween for receiving from said poles an electric signal upon said thermal excursion member causing said contact to contact one or the other of said poles;

first amplifier means for switching on said electrical heater communicated to one said pole; and, second amplifier means for switching on said electrical cooler communicated to the other said pole whereby said thermal excursion member either contacts said one pole to produce electrical heating, contacts said other pole to produce electrical cooling, or dwells in said spatial interval therebetween without heating or cooling.

13. A process utilizing a double throw single pole thermostat for controlling the temperature range of a controlled temperature chamber, said process comprising the steps of:

providing a straight bimetallic strip thermal excursion member having thermally differential expanding and contracting portions including a mounting portion at one end a contact portion at an opposite end, and a conductor for communicating electric current to said contact portion:

cantilever mounting said thermal excursion member at said mounting portion in thermal communication with said temperature controlled chamber;

providing a beam support for supporting said bimetallic strip at a location spaced apart from said cantilever mounting and located between said cantilever mounting and said contact portion, said beam support including an adjustment screw for biasing the thermal excursion of said strip to change the range of temperature response of said thermostat;

providing a spring substantially co-axially opposed to said adjustment screw for biasing said strip against said adjustment screw and providing a vibration de-coupling portion of said beam support for said bimetallic strip;

providing paired spaced apart contact poles defining said first and second throws, said spaced apart contact poles sufficiently spaced apart for permitting said thermal excursion member at said contact portion to freely move in excursion between said poles for forming contact with one or the other of said poles, and having an excursion interval between said poles where said contact is not in contact with either of said poles;

mounting said poles with respect to said housing to dispose said poles with the contact portion of said thermal excursion member mounted therebetween whereby heat energy communicated to or from said thermal excursion member caused said contact portion to move into contact with one or the other of said poles or to a position between said poles out of contact with said poles; and, varying the spacing between said poles to cause the temperature range of said controlled temperature chamber to increase with increased spacing between said poles.

* * * * *